Patented Apr. 28, 1953

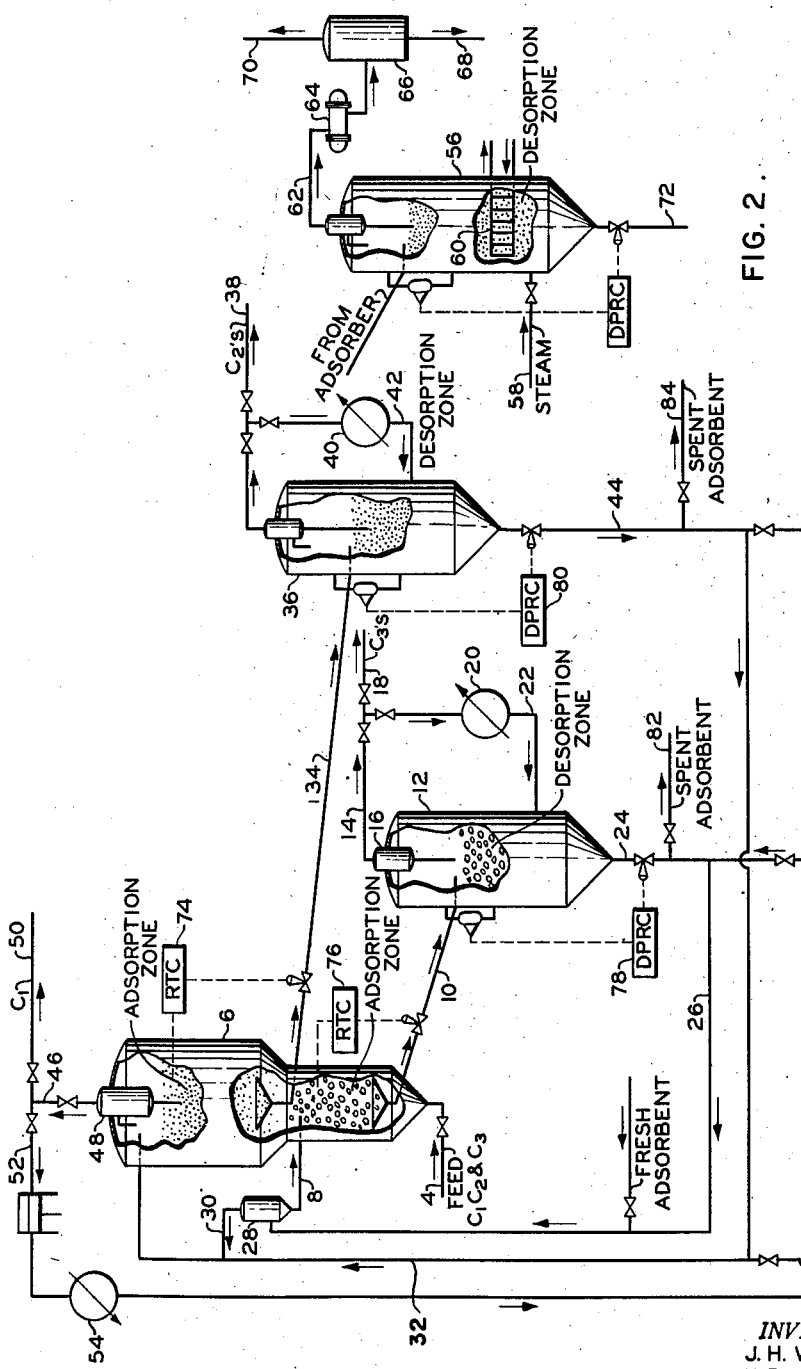

2,636,574

UNITED STATES PATENT OFFICE 2,636,574

FLUIDIZED SELECTIVE ADSORPTION SEPARATION PROCESS

John H. Widdowson and Howard R. Sailors, Bartlesville, Okla., assignors to Phillips Petroleum Company, a corporation of Delaware Application December 21, 1950, Serial No. 202,002

10 Claims. (Cl. 183—114.2)

This invention relates to selective adsorption. In a more specific aspect it relates to separation of gaseous mixtures utilizing a selective adsorbent in fluidized state. In a still more specific aspect, this invention relates to the separation of natural and/or refinery residue gases utilizing fluidized selective adsorbents.

It is known in the art that gaseous mixtures can be separated utilizing fluidized selective adsorbents. However, the fluidized processes of the prior art do not satisfactorily provide a means for separating gaseous mixtures into three or more fractions. Prior art processes teach the separation of a gaseous mixture into two fractions and require doubling the separation equipment if the gaseous mixture is separated into three fractions, that is, an overhead fraction, an intermediate fraction and a bottoms fraction. The process of our invention is an improvement over prior art processes, since we provide a process which can be operated to produce one or more side-cut fractions, which is easy and economical to operate and which uses a relatively small amount of equipment, thus cutting down capital expenditure.

In the process of our invention wherein one side-cut fraction is produced, a gaseous mixture comprising material of intermediate adsorbability, a less readily adsorbed material and a more readily adsorbed material is passed into a first section of an adsorption zone wherein a finely divided solid selective adsorbent is suspended in said gaseous mixture. In this first section the more readily adsorbed material is adsorbed by the solid selective adsorbent. The resulting adsorbent is withdrawn from the first section of the adsorption zone and the adsorbate is stripped from the adsorbent in a stripping zone. Resulting stripped adsorbent is cooled and recycled to the first section of the adsorption zone to be used for further adsorption. A finely divided solid selective adsorbent having a particle size smaller than that of the adsorbent employed in the first adsorption operation is suspended in unadsorbed gases resulting from said first adsorption operation in a second section of the adsorption zone, and the material of intermediate adsorbability is adsorbed by this selective adsorbent. The resulting adsorbent from this second adsorption operation is removed from the adsorption zone, and the adsorbate is stripped from the adsorbent in a second desorption zone. The resulting stripped adsorbent is cooled and recycled to the second section of the adsorption zone for further use in adsorbing material of intermediate adsorbability. Less readily adsorbed material in the gaseous mixture which is unadsorbed is removed from the second section of the adsorption zone. If the gaseous mixture contains two components of intermediate adsorbability, the gaseous mixture can be separated into four fractions by using an adsorption zone with three sections and selective adsorbents of three sizes. By the use of our process as many fractions can be produced as are desired, providing fractions or components are of different adsorbability.

It is an object of this invention to provide a process for carrying on selective adsorption separation.

It is another object of our invention to provide a process for separating a gaseous mixture into three or more fractions by the use of fluidized absorbents.

Still another object of our invention is to provide a process for treating natural and/or refinery residue gases to separate same into three or more fractions by the use of fluidized selective adsorbents.

Other objects and advantages of the process of our invention will become apparent to one skilled in the art upon reading this disclosure.

In the drawings which accompany and are a part of this disclosure, Figure 1 is a schematic flow sheet showing a preferred method of carrying on our process to separate a gaseous mixture into three fractions, that is, an overhead fraction, a side-cut fraction and a bottoms fraction. Two stripping zones are used in conjunction with an adsorption zone having two sections. Figure 2 of the drawings schematically shows another method of stripping the selective adsorbent which has been removed from each of the sections of the adsorption zone.

The process of our invention can be used to separate a gaseous mixture comprising a material of intermediate adsorbability, a less readily adsorbed material and a more readily adsorbed material into three fractions. A gaseous mixture can be separated into as many fractions as there are components in the feed gas of different adsorbabilities by the use of enough sections in the adsorption zone and fluidized adsorbents of enough different sizes. Throughout the petroleum and natural gas industries as well as the chemical industries, hydrocarbon streams comprising $C_1$ to $C_4$ and other low-boiling normally gaseous materials are available. In the case of natural gas residue streams, these hydrocarbon materials are usually saturated, while in the case of refinery residue streams, these hydrocarbons are usually a mixture of saturated and unsaturated compounds.

In either case our process can be utilized to separate these gas streams into their components as desired. These streams will also contain nitrogen and hydrogen. The process of our invention is particularly valuable in treating these streams to produce a $C_2$ concentrate and a $C_3$ concentrate for conversion processes, such as conversion to ethylene to be used in the synthesis of chemicals or valuable fuels. Another particularly valuable separation which can be made by using the process of our invention is the treatment of a natural and/or refinery residue gas to separate and recover a $C_2$ stream and a $C_3-C_4$ stream to be used or marketed as LPG. The separation and recovery of ethylene from the low-boiling normally gaseous materials and effluent resulting from the pyrolysis of low-boiling normally gaseous saturated hydrocarbons can be accomplished by the process of our invention. Such materials usually comprise methane, ethane, ethylene, propane, propylene, butanes and butylenes. If the stream contains methane and $C_2$ and $C_3$ hydrocarbons, it can be separated into a methane stream, an ethane stream, an ethylene stream, and a $C_3$ hydrocarbon stream. Butanes and butylenes can be handled in our process and can be separated and recovered along with the $C_3$ hydrocarbons or they can be produced as a $C_4$ hydrocarbon stream. Many other separations can be made using the process and apparatus of our invention as will be apparent to one skilled in the art.

The process of our invention is best understood from the following description with reference to accompanying Figures 1 and 2 of the drawings. Figure 1 schematically sets forth the process whereby a mixture of gases, for example, a gas comprising methane, ethane and propane can be separated into an overhead stream of methane, a side-cut of ethane, and a bottoms fraction of propane. It is to be understood that the following discussion is not to unduly limit the scope of our invention.

Referring now to Figure 1, the feed gas stream of methane, ethane and propane is passed via line 4 into the lower portion of adsorption zone 6. Therein the feed gas is directly contacted with a finely divided selective adsorbent, such as activated charcoal, silica gel, etc., passed into the lower section of adsorption zone 6 via line 8. The velocity of the feed gas stream through the lower section and the size of the selective adsorbent particles are such that contact occurs while the silica adsorbent is in a fluidized state, that is, the selective adsorbent is in suspension in the gas stream, is subject to top to bottom mixing and has a net downward velocity so that it can be removed, preferably from the lower portion of the lower section of adsorption zone 6. In operation, this selective adsorbent is not allowed to pass into the upper section of adsorption zone 6. However, due to a small amount of attrition which is encountered, small particles of adsorbent do pass into the upper section of adsorption zone 6, but as will be seen hereinafter, this causes no difficulty since these small particles of adsorbent are utilized in the upper section of adsorption zone 6 to adsorb ethane.

Contamination of adsorbent containing adsorbed $C_3$'s with adsorbent containing $C_2$'s is prevented because the adsorbent in the lower portion of zone 6 containing said adsorbed $C_3$'s will remain in said lower portion due to the size of said adsorbent relative to the size of the adsorbent in the upper portion of adsorbent zone 6. Disregarding the above-mentioned attrition, the particle size of the adsorbent is varied so that any particular part thereof will remain connected with one specific zone. The gas velocity will not be great enough to carry the particles in a lower zone up into a succeeding zone. The separation is not dependent upon particle size except for the fact that the use of different particle sizes enables us to maintain distinct zones. The more readily adsorbed fraction is adsorbed in a first zone and, therefore, the second zone adsorbs the next more readily adsorbed fraction.

Selective adsorbent having propane adsorbed thereon is withdrawn from the lower section of adsorption zone 6 via line 10 and is passed into desorption zone 12. In desorption zone 12, the propane adsorbate is stripped from the selective adsorbent. Resulting propane is removed from desorption zone 12 via line 14 after entrained adsorbent is removed by separator 16 which can conveniently be a cyclone separator, a Cottrell precipitator or a supersonic separator. This selective adsorbent, which has been removed from the propane stream, is returned to the preferably fluidized bed of selective adsorbent in the lower portion of desorption zone 12. We have found it convenient to use a portion of the propane stream produced as the stripping gas with the remainder being produced as product withdrawn via line 18. The portion to be used as stripping gas is heated in exchanger 20 and passed into desorption zone 12 via line 22 wherein it is directly contacted with the selective adsorbent passed into desorption zone 12 via line 10. The propane is preferably stripped from the selective adsorbent while the adsorbent is in a fluidized state, that is, subject to top to bottom mixing while in suspension and having a net downward velocity so that stripped adsorbent can be removed from the lower portion of the desorption zone.

Stripped adsorbent is removed from desorption zone 12 via line 24 and passed back into the lower section of adsorption zone 6 via lines 26 and 8 to be used for the further adsorption of propane. We find it desirable to use a portion of unadsorbed gases which have been cooled to pick up and cool this adsorbent prior to its reintroduction into the adsorption section. This gas stream used to cool and transport the selective adsorbent is separated from selective adsorbent in separator 28 which can conveniently be a cyclone separator, Cottrell precipitator, or a supersonic separator. The resulting gases are withdrawn from separator 28 via line 30 and are either passed into line 32 or are combined with the overhead stream which is produced as hereinafter set forth.

Unadsorbed gases are withdrawn from the lower section of adsorption zone 6 and are passed into an upper section of adsorption zone 6, which is preferably enlarged as shown so that the gas velocity is reduced. The selective adsorbent of smaller particle size than that used in the lower section of adsorption zone 6 is passed into the upper section via line 32. In this upper adsorption section this selective adsorbent and the unadsorbed gases resulting from the adsorption in the lower section are directly contacted so that the selective adsorbent is in fluidized state, that is, subject to top and bottom mixing with a net downward velocity of the selective adsorbent so that it can be removed from the lower portion of this adsorption section. In the upper adsorption section, the ethane is adsorbed on the selective adsorbent.

Selective adsorbent is removed from the lower portion of the upper adsorption section of adsorption zone 6 via line 34 and passed into desorption zone 36 wherein the ethane is removed from the selective adsorbent in preferably the same manner as that employed in stripping propane from the selective adsorbent in desorption zone 12. The selective adsorbent is preferably sripped while in fluidized state with the ethane being produced via line 38. Here again, we find that a portion of the ethane stream heated in exchanger 40 and passed into desorption zone 36 via line 42 can be advantageously used as the stripping medium.

Resulting stripped adsorbent is withdrawn from the lower portion of desorption zone 36 via line 44 and passed back into the upper portion of the upper section of adsorption zone 6 via line 32. A second portion of unadsorbed overhead gas can very advantageously be cooled and used to cool and transport this selective adsorbent back into the adsorption section for further use in adsorbing ethane.

Unadsorbed gases are withdrawn from the upper portion of the upper section of adsorption zone 6 via line 46, after entrained selective adsorbent has been removed in separator 48 which can conveniently be a cyclone separator, a Cottrell precipitator or a supersonic separator. This methane stream is withdrawn from the system via line 50. As set forth hereinbefore, a portion of this methane stream is passed via line 52 through exchanger 54 wherein it is cooled. The cooled methane stream is then used to cool and transport the selective adsorbents back into their respective adsorption sections of adsorption zone 6.

Figure 2 schematically shows another stripping method which we have found can be used advantageously in carrying on the process of our invention. Steam is used as the stripping gas and is passed into this desorption zone 56 via line 58. Heating coils 60 are employed to furnish heat to aid in stripping. Resulting stripped ethane or propane is removed in admixture with steam via line 62 and passed into exchanger 64 wherein the steam is condensed. Resulting ethane or propane and water are separated in separator 66, water being withdrawn via line 68 and the ethane or propane being produced via line 70. Resulting stripped adsorbent is removed from adsorption zone 56 via line 72 and is passed back into adsorption zone 6 either into the upper section or the lower section, as the case may be.

We find it desirable to use recording temperature controllers 74 and 76 with temperature control points in the upper section and lower section of adsorption zone 6, respectively. The temperature in the fluidized bed indicates the particular adsorption which is taking place. For instance, if the temperature in the upper portion of the fluidized bed in the lower adsorption section gets too low, indicating ethane adsorption, the temperature controller will reduce the amount of adsorbent withdrawn via line 10, thus maintaining the adsorbent in the lower section for a longer period of time so that ethane will exit from the lower section and not be adsorbed to contaminate the propane product. Recording temperature controller 74 functions in the same manner to prevent methane from contaminating the ethane product, that is, if the temperature indicates methane adsorption in the upper section of the fluidized bed, the rate of withdrawal of adsorbent via line 34 is reduced.

Differential pressure recording controllers 78 and 80 are utilized with desorption zones 12 and 36, respectively, to maintain the desired level of the fluidized beds, that is, to maintain the interface between the relatively dense phase and relatively light phase where desired. When due to the recording temperature controllers reducing the amount of absorbent passed to the desorption zone, the differential pressure recording controllers reduce the amount of stripped adsorbent withdrawn from the desorption zone so that there is no excessive buildup in the adsorption sections of adsorption zone 6. We find it desirable to use the same system whether a portion of the product gas is used as a stripping medium or whether steam is used as the stripping gas.

As will be apparent to one skilled in the art by increasing the number of adsorption sections in adsorption zone 6 and by increasing the number of desorption zones, a feed gas could be separated into more than three fractions. A different particle size of selective adsorbent is used in each adsorption section.

We have found that in the practice of our invention it is preferred to use an adsorbent of particle size 5 to 200 mesh, for instance, in the process wherein a feed mixture is separated into three fractions a particle size of from 5 to 40 mesh in the lower section and a particle size of 60 to 200 mesh in the upper section are preferred. The particle sizes of the adsorbent are dependent on each other and could be overlapping to a certain extent. Linear gas velocity is preferably in the range of 0.1 to 30 feet per second with a ratio of velocities of 2:1 to 10:1, lower to upper sections.

If the selective adsorbent becomes contaminated or poisoned during the operation of the process, we find that it can be reactivated for further use by stripping same with superheated steam at a temperature of from 900° F. to 1200° F. in a separate reactivation zone or chamber (not shown on the drawings). The spent adsorbent is withdrawn for reactivation via lines 82 and 84 after stripping in desorption zones 12 and 36, respectively. At reactivation temperatures of 900° F. to 1200° F. in the presence of steam, $C_5$ and higher boiling hydrocarbons, absorption oils, resins formed from diolefins, etc., can be removed from the adsorbent. It is desirable to remove $C_5$ and higher boiling hydrocarbon materials from the feed steam prior to treating by the process of our invention.

Mixtures of selective adsorbents can be used to advantage in some separation operations, for instance, hydrophilic selective adsorbent, such as silica gel, can be used in conjunction with a hydrophobic selective adsorbent, such as many charcoal selective adsorbents, the hydrophilic adsorbent removing moisture and the hydrophobic adsorbent selectively adsorbing the other gases present. Also, selective absorbents, such as cuprous halides, can be used with selective adsorbents in some cases to separate mixtures containing unsaturated carbon atoms, such as olefins, diolefins, carbon monoxide, etc. These cuprous halide absorbents, supported or unsupported, can be stripped, cooled and reactivated in much the same manner as the selective adsorbents.

The preferred specific embodiment of the proc-

We claim:

1. A process for separating a gaseous mixture comprising a material of intermediate adsorbability, a less readily adsorbed material and a more readily adsorbed material into three fractions which comprises: suspending a finely divided solid selective adsorbent in said mixture in a first section of an adsorption zone under conditions such as to effect adsorption of said more readily adsorbed material in a first adsorption operation; separating adsorbent resulting from said first adsorption operation and stripping same by heating same; cooling resulting stripped adsorbent and recycling resulting cooled adsorbent to said first section of said adsorption zone; suspending a finely divided solid selective adsorbent having a particle size smaller than that of said adsorbent employed in said first adsorption operation in unadsorbed gases resulting from said first adsorption operation in a second section of said adsorption zone under conditions such as to effect adsorption of said material of intermediate adsorbability in a second adsorption operation; separating adsorbent resulting from said second adsorption operation and stripping same by heating same; and cooling resulting stripped adsorbent and recycling resulting cooled adsorbent to said second section of said adsorption zone.

2. The process of claim 1 wherein said granular adsorbent employed in said first and second sections is activated charcoal.

3. The process of claim 2 wherein gas velocity through said adsorption zone is within a range of from 0.1 to 30 feet per second with a ratio of gas velocity in said first section to said second section in a range of from 2:1 to 10:1, said granular adsorbent employed in said first section has a particle size of from 5 to 40 mesh and said granular adsorbent employed in said second section has a particle size of from 60 to 200 mesh.

4. A process for separating and recovering a $C_2$ hydrocarbon fraction from a feed gas mixture comprising methane, $C_2$ and $C_3$ hydrocarbons which comprises: introducing finely divided activated charcoal into a first section of an adsorption zone, therein forming a fluidized bed of same by directly contacting same with said gas mixture passed into said first section and adsorbing said $C_3$ hydrocarbons on said activated charcoal; withdrawing resulting activated charcoal from said first section and passing same into a first stripping zone, therein forming a fluidized bed of same by directly contacting same with a stripping gas passed into said first stripping zone, heating said resulting activated charcoal and stripping $C_3$ hydrocarbons from same; withdrawing resulting $C_3$ hydrocarbons from said first stripping zone, withdrawing resulting stripped activated charcoal from said first stripping zone and cooling same by directly contacting same with a cooled gaseous stream comprising unadsorbed methane produced as hereinafter set forth; separating resulting cooled activated charcoal from said stream of methane and recycling such cooled charcoal to said first section of said absorption zone; introducing finely divided activated charcoal having a particle size smaller than that of said activated charcoal employed in said first section of said adsorption zone into a second section of said adsorption zone, therein forming a fluidized bed of same by directly contacting same with unadsorbed gases resulting from said adsorption in said first section and passed into said second section and adsorbing said $C_2$ hydrocarbons on said activated charcoal; withdrawing a stream comprising unadsorbed methane from said second section; withdrawing resulting activated charcoal from said second section and passing same into a second stripping zone, therein forming a fluidized bed of same by directly contacting same with a stripping gas passed into said second stripping zone, heating said resulting activated charcoal and stripping $C_2$ hydrocarbons from same; withdrawing resulting $C_2$ hydrocarbons from said second stripping zone; withdrawing resulting stripped activated charcoal from said second stripping zone and cooling same by directly contacting same with a cooled gaseous stream comprising unadsorbed methane produced as hereinbefore set forth; separating resulting cooled activated charcoal from said methane stream and recycling such cooled charcoal to said second section of said adsorption zone.

5. The process of claim 4 wherein said feed gas mixture also contains nitrogen which is removed with unadsorbed methane from said second section of said adsorption zone.

6. The process of claim 4 wherein said feed gas mixture also contains $C_4$ hydrocarbons which are removed with $C_3$ hydrocarbons from said first stripping zone.

7. The process of claim 4 wherein said feed gas mixture comprises hydrogen, methane, ethane, ethylene, propane and propylene.

8. The process of claim 4 wherein gas velocity through said adsorption zone is within a range of from 0.1 to 30 feet per second with a ratio of gas velocity in said first section to said second section in a range of from 2:1 to 10:1, said activated charcoal employed in said first section has a particle size of from 5 to 40 mesh, said activated charcoal employed in said second section has a particle size of from 60 to 200 mesh and said stripping gas passed into said first and second stripping zones is steam.

9. A process for separating a gaseous mixture comprising materials of varying absorbability comprising: successively introducing a gaseous mixture into a series of adsorption zones containing a finely divided suspended solid selective adsorbent under conditions such as to effect adsorption of the most readily adsorbed component of the mixture in each said zone in which each succeeding adsorbent zone operates with successively smaller particle size adsorbents; removing adsorbent resulting from said adsorption operation in each said zone and separately stripping same by heating; cooling resulting stripped adsorbent and directly recycling resulting cooled adsorbent to each said zone.

10. A process for separating a gaseous mixture comprising materials of varying absorbability which comprises: suspending finely divided solid selective adsorbent in said mixture in a first section of a series of adsorption zones containing at least two zones under conditions such as to effect adsorption of a preferentially adsorbed material; separating adsorbent resulting from said first adsorption operation; stripping the adsorbed gas from said absorbent by heating; cooling resulting stripped adsorbent and recycling said cooled adsorbent to said first section; passing gaseous effluent from said first section of said series of adsorption zones through at least one additional adsorption zone containing suspended finely divided solid selective adsorbent; said selective adsorbent in each said zone having a particle size smaller than that of said adsorbent in a preceding adsorption zone; separating adsorbent from each said additional adsorption zone; stripping the adsorbed gas from said adsorbent by heating; cooling resulting stripped adsorbent and recycling resulting cooled adsorbent to each said section of said additional adsorption zone.

JOHN H. WIDDOWSON.
HOWARD R. SAILORS.

References Cited in the file of this patent

UNITED STATES PATENTS

| Number | Name | Date |
|---|---|---|
| 2,529,289 | Gilliland | Nov. 7, 1950 |
| 2,539,005 | Berg | Jan. 23, 1951 |
| 2,548,192 | Berg | Apr. 10, 1951 |
| 2,548,502 | Small | Apr. 10, 1951 |